(12) United States Patent
Gümbel et al.

(10) Patent No.: US 10,676,283 B2
(45) Date of Patent: Jun. 9, 2020

(54) TREATMENT PLANT FOR TREATING WORKPIECES

(71) Applicant: EISENMANN SE, Böblingen (DE)

(72) Inventors: Urs Gümbel, Nürtingen (DE); Martin Riegraf, Reutlingen (DE)

(73) Assignee: EISENMANN SE, Böblingen (DE)

( * ) Notice: Subject to any disclaimer, the term of this patent is extended or adjusted under 35 U.S.C. 154(b) by 0 days.

(21) Appl. No.: 16/391,491

(22) Filed: Apr. 23, 2019

(65) Prior Publication Data

US 2019/0329982 A1    Oct. 31, 2019

(30) Foreign Application Priority Data

Apr. 25, 2018 (DE) .......................... 10 2018 109 934

(51) Int. Cl.
*B65G 17/12* (2006.01)
*B65G 69/20* (2006.01)

(52) U.S. Cl.
CPC .............. *B65G 17/12* (2013.01); *B65G 69/20* (2013.01)

(58) Field of Classification Search
CPC ...... B65G 17/12; B65G 17/123; B23P 21/004
USPC ......... 198/339.1, 463.5, 463.6, 465.1, 465.2; 414/222.01, 222.13
See application file for complete search history.

(56) References Cited

U.S. PATENT DOCUMENTS

| | | | | |
|---|---|---|---|---|
| RE25,886 E | * | 10/1965 | Smith .................... | B23P 21/004 29/791 |
| 3,807,126 A | * | 4/1974 | Schwarz ................. | B65B 53/06 53/442 |
| 4,203,204 A | * | 5/1980 | Murphy ................... | B21J 15/10 29/281.1 |
| 4,357,875 A | * | 11/1982 | Scheel ....................... | B61J 1/10 104/166 |

(Continued)

FOREIGN PATENT DOCUMENTS

| DE | 10 2015 006 098 | 11/2016 |
|---|---|---|
| DE | 10 2016 004 484 | 10/2017 |

*Primary Examiner* — Joseph A Dillon, Jr.
(74) *Attorney, Agent, or Firm* — Schroeder Intellectual Property Law Group, LLC (57) ABSTRACT

A treatment plant for treating workpieces having a treatment installation having a housing which defines a treatment space and a conveyor system having a multiplicity of transport trucks for conveying workpieces through the treatment space. Each transport truck has a running gear and a fastening installation for at least one workpiece, the running gear and the fastening installation being coupled to one another by a connection installation. A running space for the running gear is present outside the treatment space, the running space connected to the treatment space by a connection passage in the upward direction so that the running gear is capable of being moved in the running space, wherein the fastening installation is conjointly carried in the treatment space and the connection installation extends through the connection passage. A cover installation having at least one walk-on cover element is present in the treatment (Continued)

space, the cover element being capable of being moved between a walk-on position in which the cover element covers the connection passage and a release position in which the cover element can be passed by the connection installation of one of the transport trucks.

15 Claims, 4 Drawing Sheets

(56) References Cited

U.S. PATENT DOCUMENTS

| | | | | |
|---|---|---|---|---|
| 4,439,103 | A * | 3/1984 | Almagor | B66B 11/006 104/162 |
| 4,548,135 | A * | 10/1985 | Kupczyk | B65G 37/00 104/135 |
| 4,564,100 | A * | 1/1986 | Moon | B65G 13/06 104/168 |
| 4,691,640 | A * | 9/1987 | Murai | B65G 19/282 104/140 |
| 4,693,358 | A * | 9/1987 | Kondo | B62D 65/18 198/339.1 |
| 4,711,343 | A * | 12/1987 | Dixon | B23Q 7/1457 104/172.5 |
| 4,734,979 | A * | 4/1988 | Sakamoto | B23P 21/004 198/468.4 |
| 4,768,914 | A * | 9/1988 | Sing | B65G 1/0478 198/300 |
| 4,805,299 | A * | 2/1989 | Sekimoto | B23P 21/004 29/715 |
| 4,827,598 | A * | 5/1989 | Sakamoto | B23P 21/00 198/465.1 |
| 4,924,996 | A * | 5/1990 | Svensson | B05B 15/62 198/341.05 |
| 4,951,802 | A * | 8/1990 | Weissgerber | B62D 65/02 198/346.1 |
| 5,007,783 | A * | 4/1991 | Matsuo | B23P 21/004 104/252 |
| 5,033,394 | A * | 7/1991 | Summa | B61B 10/04 104/106 |
| 5,067,607 | A * | 11/1991 | Mizuta | B23P 21/004 198/733 |
| 5,127,336 | A * | 7/1992 | Wakabayashi | B61J 1/10 104/243 |
| 5,686,148 | A * | 11/1997 | Suzuki | B62D 65/18 427/444 |
| 5,927,935 | A * | 7/1999 | Cresgy | B23P 19/001 198/468.2 |
| 5,943,768 | A * | 8/1999 | Ray | B23K 37/047 198/465.1 |
| 6,070,534 | A * | 6/2000 | Lehrieder | B61B 13/12 104/130.09 |
| 6,145,180 | A * | 11/2000 | Kogai | B62D 65/02 29/429 |
| 6,170,650 | B1 * | 1/2001 | Morikiyo | B62D 65/00 198/465.1 |
| 6,324,992 | B1 * | 12/2001 | Morikiyo | B61B 13/12 104/165 |
| 6,814,218 | B2 * | 11/2004 | Nishihara | B65G 35/06 198/370.04 |
| 6,892,446 | B2 * | 5/2005 | Hwang | H05K 13/0061 198/346.1 |
| 6,991,087 | B2 * | 1/2006 | Krannich | B05C 3/10 118/416 |
| 7,090,068 | B2 * | 8/2006 | Matsuo | B23Q 7/02 198/465.1 |
| 7,306,088 | B2 * | 12/2007 | Fenzl | B23P 21/004 198/346.2 |
| 8,312,979 | B2 * | 11/2012 | Ooe | B62D 65/18 198/346.1 |
| 8,408,381 | B2 * | 4/2013 | Murakami | B65G 35/06 198/465.1 |
| 8,413,669 | B2 * | 4/2013 | Barreyre | B60S 3/004 134/124 |
| 8,459,438 | B2 * | 6/2013 | Ooe | B62D 65/18 198/345.1 |
| 8,627,942 | B2 * | 1/2014 | Terazawa | B62D 65/04 104/172.2 |
| 8,733,617 | B2 * | 5/2014 | Kilibarda | B23K 37/047 228/47.1 |
| 8,771,046 | B2 * | 7/2014 | Ishida | A63F 3/00082 463/6 |
| 8,899,405 | B2 * | 12/2014 | Ookubo | B23P 19/00 198/465.2 |
| 9,038,807 | B2 * | 5/2015 | Monti | B62D 65/18 198/339.1 |
| 9,463,932 | B2 * | 10/2016 | Nakamura | B61B 13/125 |
| 10,359,234 | B2 | 7/2019 | Robbin | |
| 2001/0015003 | A1 * | 8/2001 | Kurtz | B23P 21/004 29/430 |
| 2003/0079967 | A1 * | 5/2003 | Nishihara | B61B 13/127 198/838 |
| 2004/0134756 | A1 * | 7/2004 | Nishizawa | B23P 19/001 198/465.2 |
| 2005/0205390 | A1 * | 9/2005 | Childs | B23Q 7/04 198/339.1 |
| 2007/0175732 | A1 * | 8/2007 | Ellens | B62D 65/18 198/465.1 |
| 2008/0075577 | A1 * | 3/2008 | Shimizu | B65G 47/46 414/792.8 |
| 2011/0094855 | A1 * | 4/2011 | Terazawa | B62D 65/04 198/464.1 |
| 2012/0027952 | A1 * | 2/2012 | Reising | H01L 21/67126 427/569 |
| 2013/0014370 | A1 * | 1/2013 | Shimizu | B62D 65/06 29/426.2 |
| 2013/0313075 | A1 * | 11/2013 | Robbin | B62D 65/18 198/604 |
| 2014/0090252 | A1 * | 4/2014 | Sisco | B23P 23/06 29/897.2 |
| 2014/0360841 | A1 * | 12/2014 | Ooe | B65G 19/02 198/465.1 |
| 2014/0374214 | A1 * | 12/2014 | Nishihara | B05C 3/10 198/339.1 |
| 2015/0047184 | A1 * | 2/2015 | Bellezza | B62D 65/18 29/795 |
| 2015/0086303 | A1 * | 3/2015 | Nakagawa | H01L 21/67173 414/222.13 |
| 2016/0009497 | A1 * | 1/2016 | Nakamura | B61B 13/125 198/711 |
| 2016/0159577 | A1 * | 6/2016 | Okazaki | B61F 9/00 198/339.1 |
| 2017/0137149 | A1 * | 5/2017 | Malicki | B64F 1/002 |
| 2019/0219304 | A1 * | 7/2019 | Robbin | F24H 9/0057 |

* cited by examiner

TREATMENT PLANT FOR TREATING WORKPIECES

RELATED APPLICATIONS

The present application claims priority to German Patent Application No. 10 2018 109 934.7 filed Apr. 25, 2018, the contents of which are fully incorporated herein by reference.

FIELD OF THE INVENTION

The invention relates to a treatment plant for treating workpieces, in particular for treating vehicle bodies, having
  a) a treatment installation having a housing which defines a treatment space having a floor;
  b) a conveyor system which comprises a multiplicity of transport trucks by means of which the workpieces are capable of being conveyed through the treatment space, wherein each transport truck comprises a running gear and a fastening installation for at least one workpiece, said running gear and said fastening installation being coupled to one another by means of a connection installation;
wherein
  c) a running space for the running gear is present outside the treatment space, said running space by way of a connection passage in the upward direction being connected to the treatment space in such a manner that the running gear is capable of being moved in the running space, wherein the fastening installation is conjointly carried in the treatment space and the connection installation extends through the connection passage.

BACKGROUND OF THE INVENTION

In the case of such treatment installations there is correspondingly a connection passage in a tunnel wall which separates the treatment space from the guiding region, at least the connection installation of a transport truck extending through said connection passage.

The treatment installation can in particular be a workstation, a dryer, or a coating cabin, wherein the treatment space in the case of a dryer or a coating cabin is typically conceived as a treatment tunnel; this will be explained once more further below.

In the case of treatment plants of this type known in the market, the region around the connection passage, or the connection passage per se, represents a hazard to people who are present in the treatment space in the operation or in a stationary phase of the treatment installation; the connection passage is in particular a trip hazard to such people. This is particularly relevant in the case of workstations in which assembly jobs or quality assurance measures have to be carried out and in which operators often have to cross the connection passage.

SUMMARY OF THE INVENTION

It is therefore an object of the invention to provide a treatment plant of the type mentioned at the outset which offers an improved operational safety to people.

This object may be achieved in that
  d) a cover installation which comprises at least one walk-on cover element is present in the treatment space, said cover element being capable of being moved between a walk-on position in which said cover element covers the connection passage and a release position in which said cover element can be passed by the connection installation of one of the transport trucks.

The invention is based on the concept that it is possible for the connection passage to be covered so as to be safe for walking or stepping thereon, on the one hand, without impeding the passage of a transport truck, on the other hand.

The cover element herein can be flexible and fastened so as to be immovable, or can be flexible and mounted so as to be movable, or can be rigid and mounted so as to be movable. In the case of one or a plurality of cover elements which are flexible, adequate safety in terms of stepping thereon in the walk-on position can nevertheless be guaranteed.

The cover element is preferably mounted so as to be pivotable about a horizontal pivot axis. The cover element can thus be pivoted upward into the treatment tunnel.

The cover installation particular preferably comprises a plurality of cover elements which in the longitudinal direction of the treatment space are disposed so as to be mutually contiguous or mutually spaced apart. In the context of the present invention mutually contiguous means that there can indeed be a spacing between two neighboring cover elements as long as said spacing, or the intermediate space resulting therefrom, respectively, between two neighboring cover elements in turn does not per se form a hazard, in particular a trip hazard, to persons in the treatment space.

It can be advantageous for a plurality of mutually contiguous cover elements to form one cover element group. Said cover element group in this instance defines a crossing region in which the connection passage can be crossed without any risk. One or a plurality of such cover element groups can be present.

It is favorable for one or a plurality of cover elements in the longitudinal direction of the treatment space to have an extent of approximately 10 cm to approximately 20 cm, preferably of approximately 15 cm, or from approximately 50 cm to approximately 100 cm. this will be discussed once more further below.

The connection passage can be rectilinear or angled.

It is advantageous for the connection installation to comprise at least one stanchion having at least one portion which is complementary to the connection passage. Said stanchion in this instance extends out of the running space, through the connection passage, into the treatment space.

It is particularly advantageous for the transport trucks to conjointly carry in each case one adjustment installation by way of which the cover element or cover elements of the cover installation are capable of being moved from the walk-on position thereof to the release position thereof when the transport truck is moved through the treatment installation.

The adjustment installation herein preferably comprises at least one adjustment structure which in the moving direction of the transport truck leads the connection installation.

On account of the connection passage, the atmosphere of the treatment space can thus pass into the running space. Said atmosphere, in particular in the case of dryers, is contaminated with solvent which then condensates in the typically cooler running space and can precipitate onto the components of the conveying technology in the running space. However, said solvent does attack the conveyor system. In order to prevent the atmosphere from being able to flow from the treatment space, through the connection passage, into the running space and therein attack the running gears of the transport trucks, a shielding installation by way of which contact at least between the running gears of the transport trucks and the atmosphere of the treatment by way of the connection passage is at least minimized is preferably provided.

The shielding installation preferably comprises a multiplicity of sealing slats which are disposed in an overlapping manner and which are disposed and specified in such a manner that said sealing slats are pushed upward by the adjustment installation when the transport truck moves through the treatment installation.

Other advantages and aspects of the present invention will become apparent upon reading the following description of the drawings and detailed description of the invention.

BRIEF DESCRIPTION OF THE DRAWINGS

Exemplary embodiments of the invention will now be explained in more detail by means of the drawings in which.

DETAILED DESCRIPTION OF THE INVENTION

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

The figures schematically illustrate a treatment plant, overall identified by the reference sign 10, for treating workpieces 12 which in an exemplary manner are visualized as vehicle bodies 14.

The treatment plant 10 comprises a treatment installation 16 having a housing 18 which defines a treatment space 19. In the case of one preferred embodiment, the treatment installation 16 is a workstation 17 in which assembly jobs, quality control jobs, or the like, are performed and in which the treatment space 19 can be open toward the top, as is visualized by FIGS. 1 and 5.

However, the invention will be explained hereunder using the example of a treatment installation 16 in which the treatment space 19 is configured as a treatment tunnel 20 and comprises two tunnel walls in the form of side walls 22 as well as two further tunnel walls in the form of a ceiling 24 (shown only in FIG. 3) and of a floor 26. The treatment space 19 independently of the specific configuration thereof, that is to say whether open or closed, in any case has a floor 26; said floor 26 in the following is referred to as the tunnel floor 26 in the context of the treatment tunnel 20.

Such a treatment installation 16 can in particular be a dryer 28 in which the treatment tunnel 20 predefines a drying tunnel 30. Such a treatment installation 16 can also be a coating installation having a corresponding treatment tunnel in which the workpieces 12 are painted, in particular automatically with the aid of painting robots, or manually.

The workpieces 12 by way of a conveyor system 32 are conveyed through the treatment space 19, that is to say presently the treatment tunnel 20 of the treatment installation 16. The treatment installation 16 is continuously operated and accordingly has an entry at one end-side end and an exit at the opposite end-side end, wherein the exit can be seen in FIG. 3 and is identified by the reference sign 20a. The treatment space 19 can however also be conceived as a batch system and optionally have only one access by way of which the workpieces 12 are conveyed into the treatment space 19 and, after the treatment, are also conveyed out of said treatment space 19 again.

The conveyor system 32 comprises a multiplicity of transport trucks 34 on which the workpieces 12 are transported. The transport trucks 34 are repositioned on a rail system 36. In the case of a modification (not shown in detail) the transport trucks 34 can be configured as anonymously moving transport trucks in the sense of driverless transport systems which are known to a person skilled in the art as so-called AGV (automatic guided vehicles).

The present rail system 36 is configured so as to be single-tracked and comprises a support rail 38 on which a transport truck 34 is repositioned and which in the present exemplary embodiment is configured as an I-profile which is known per se. However, other profiles are also possible. The rail system 36 can also have multiple tracks, in particular two tracks. The support rail 38 is floor-bound and is anchored to the floor of the plant 10.

Each transport truck 34 comprises a running gear 40 and a drive system 42 which in the present exemplary embodiment comprises two drive rollers 44 which run on the support rail 38 and can in each case be driven by means of a drive motor 46. In this way, the transport trucks 34 are capable of being driven in a mutually independent manner. In the case of the present exemplary embodiment, the drive rollers 44 run on the upper side of the support rail 38. In one modification, the drive rollers 44 can also engage laterally on the support rail 38.

Additionally or alternatively to the transport trucks 34 discussed here, having in each case one dedicated on-board drive system 42, other transport trucks which are driven by a central drive system can optionally also be present. For example, such a central drive system can be configured by a chain gear or the like. The transport trucks 34 discussed here can accordingly also be driven and repositioned independently of other drive installations.

In order to prevent the transport truck 34 from tilting in the transporting direction or transversely to the transporting direction, a support system 48 having support rollers which bear on the support rail 38 and, in a manner known per se, prevent any corresponding tilting of the transport truck 34, is provided.

The transport truck 34 comprises a fastening installation 50 to which a workpiece 12 or a corresponding workpiece support for workpieces 12 can be fastened. For the fastening of vehicle bodies 14, the fastening installation 50 in the case of the present exemplary embodiment comprises a support profile 52 having mounting bolts 54 which, in a manner known per se, interact with counter elements on the vehicle body 14 such that the vehicle body 14 can be fixed to the fastening installation 50. The fastening installation 50 can also have a plurality of sets of such mounting bolts 54 which are adapted to dissimilar vehicle bodies 14 having different dimensions and design embodiments so that the fastening installation 50 can be flexibly utilized for dissimilar types of vehicle bodies. The fastening installation 50 thus directly receives a vehicle body 14 without the vehicle body 10 being fastened to a workpiece support, for example to a skid which is known per se.

Figure 3:
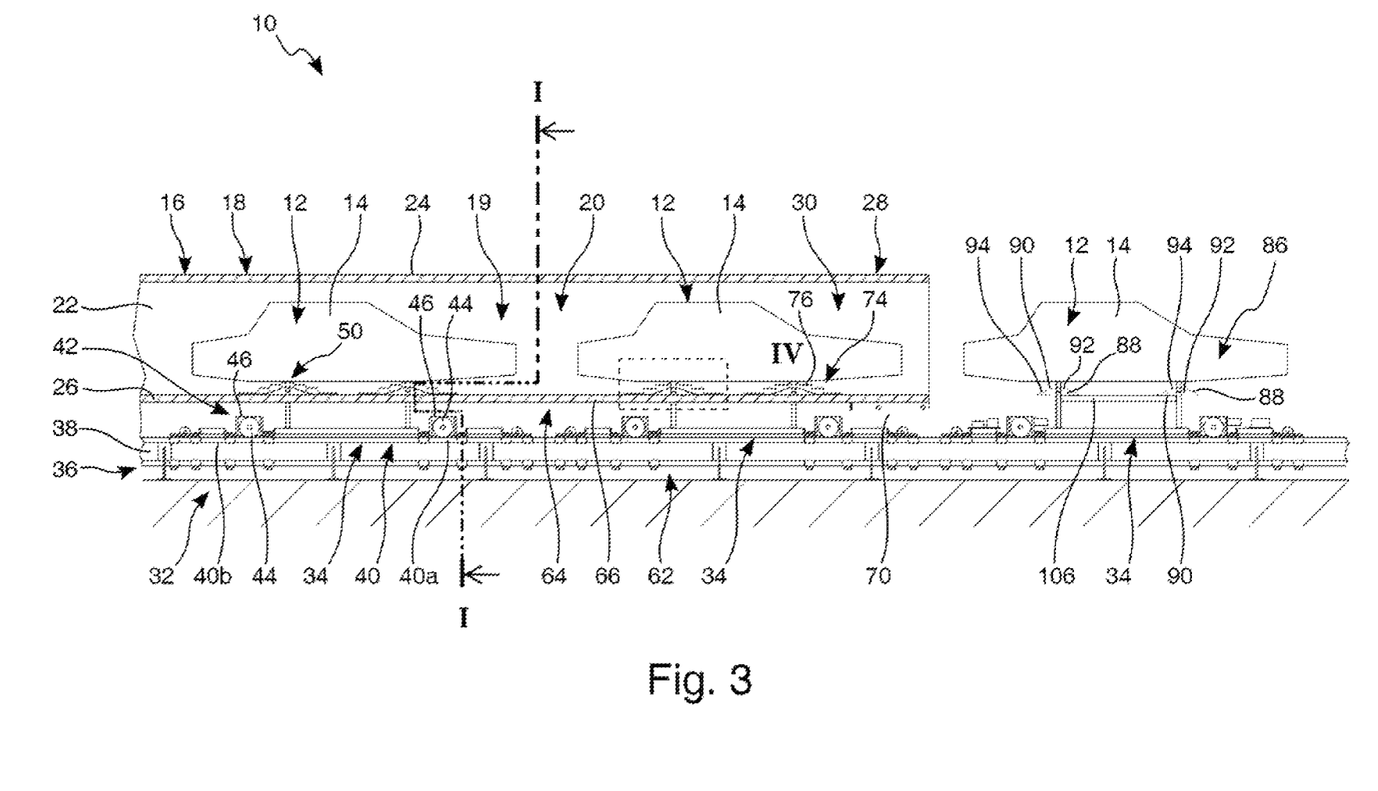
FIG. 3 shows a longitudinal section of a portion of the treatment plant according to the section line III-III in FIG. 1.

The running gear 40 of the transport truck 34 is coupled to the fastening installation 50 by means of a connection installation 56. The connection installation 56 comprises at least one upwardly pointing stanchion 58, wherein two such stanchions 58 are present in the case of the present exemplary embodiment for reasons of stability, as can be seen in FIG. 3. Each stanchion 58 present couples the running gear 40 of the transport truck 34 to the fastening installation 50.

Each stanchion 58 in the case of the present exemplary embodiment has a lower vertical portion 60*a*, a central portion 60*b* which is upwardly inclined in relation to the lower vertical portion 60*a*, and an again vertical upper portion 60*c*, wherein the lower portion 60*a* is connected to the running gear 40 of the transport truck 34, and the upper portion 60*c* is connected to the fastening installation 50. When the transport truck 54 is situated in the running space 64, the central portion 60*b* of the stanchion 58 runs in the direction toward a side wall 22 of the treatment tunnel 20.

The transport truck 34 can be configured in such a manner that said transport truck 34 is capable of passing curved portions of the support rail 38. To this end, the running gear 40 of the transport truck 34 can in particular be conceived so as to have a leading unit 40*a* and a trailing unit 40*b* which are connected to one another in an articulated manner and in each case conjointly carry one stanchion 58. This is likewise visualized in FIG. 3.

When the transport truck 34 is conceived for curved travel, the coupling between the running gear 40 and the fastening installation 50 by way of the connection installation 56 is also specified such that travel through corresponding curves is possible. To this end, the stanchions 58 are provided, for example, with rotary joints which enable the fastening installation 50 to be able to pivot about a vertical rotation axis in relation to the running gear 40 of the transport truck 34. When ascending or descending travel is alternatively or additionally to be possible, the fastening installation 50 to this end is coupled to the running gear 40 by way of horizontal pivot axes.

The treatment installation 16 and the conveyor system 32 are mutually adapted such that only part of the conveyor system 32 moves in the treatment space 19, that is to say in the treatment tunnel 20, while the other part of the conveyor system 32 is moved outside the treatment tunnel 20.

To this end, a guiding region 62 having a running space 64 which is likewise disposed outside the treatment space 19 is provided outside the treatment space 19, the rail system 36 being accommodated in said guiding region 62 and the running gear 40 of a respective transport truck 34 moving in said guiding region 62, wherein the treatment space 19 and the guiding region 62, or the running space 64, respectively, toward the top are separated by a separation wall 66. In the case of the present exemplary embodiment said separation wall 66 is a portion 68 of the tunnel floor 26, wherein the guiding region 62 having the running space 64 is disposed below the tunnel floor 26.

An arrangement of the guiding region 62, or the running space 64, respectively, "outside" the treatment space 19 is to be understood such that there is a structural separation between the treatment space 19 and the guide region 62 and the running space 64 by way of the separation wall 66 mentioned. However, this does not mean that the guide region 62 and optionally the running space 64 cannot protrude at least in regions into the treatment space 19 and in the cross section overlap with the treatment space 19.

The running space 64 can be open toward the environment of the treatment installation 16; in any case, no dedicated housing has to be present for the running space 64. In the case of the present exemplary embodiment, the running space 64 is however delimited by a dedicated running space housing 70 which comprises the separation wall 66. In other words, the portion 68 of the tunnel floor 26 in the case of the present exemplary embodiment is thus part of the running space housing 70. Alternatively, the side walls 22 of the housing 18 can also extend downward beyond the tunnel floor 26 such that said sidewalls 22 laterally delimit the running space 64; in this case, said running space 64 is then upwardly separated from the treatment tunnel 20 by way of the entire tunnel floor 26.

The running space 64 is now connected to the treatment space 19 by way of a connection passage 72 in the separation wall 66. The connection passage 72 is complementary to the connection installation 56 of the transport trucks 34.

The connection installation 56 extends through the connection passage 72 so that the fastening installation 50 having the workpiece 12 is situated in the treatment space 19, and the running gear 40 of a transport truck 34 is situated in the running space 64.

In the case of the present exemplary embodiment, the connection passage 72 is configured so as to be rectilinear and as a rectilinear passage slot or gap, the respective lower portion 60*a* of the stanchions 58 of the connection installation 56 extending through said passage slot or gap. The connection passage 72 can also be configured so as to be angled, that is to say so as to be labyrinth-like in the cross section, for example, wherein the stanchions 58 in this instance are configured so as to be complimentary to said connection passage 72. In the case of the stanchions 58 explained here, having the portions 60*a*, 60*b*, and 60*c*, above all the lower portion 60*a* of the stanchions 58 is in this instance configured so as to be complementary to such an angled connection passage 72.

As has been mentioned at the outset, the connection passage 72 represents a hazard to persons which are present in the treatment space 19, that is to say here the treatment tunnel 20, whether in operation or in a stationary phase of the treatment installation 16; the connection passage 72 is in particular a tripping hazard to such people.

Figure 1:
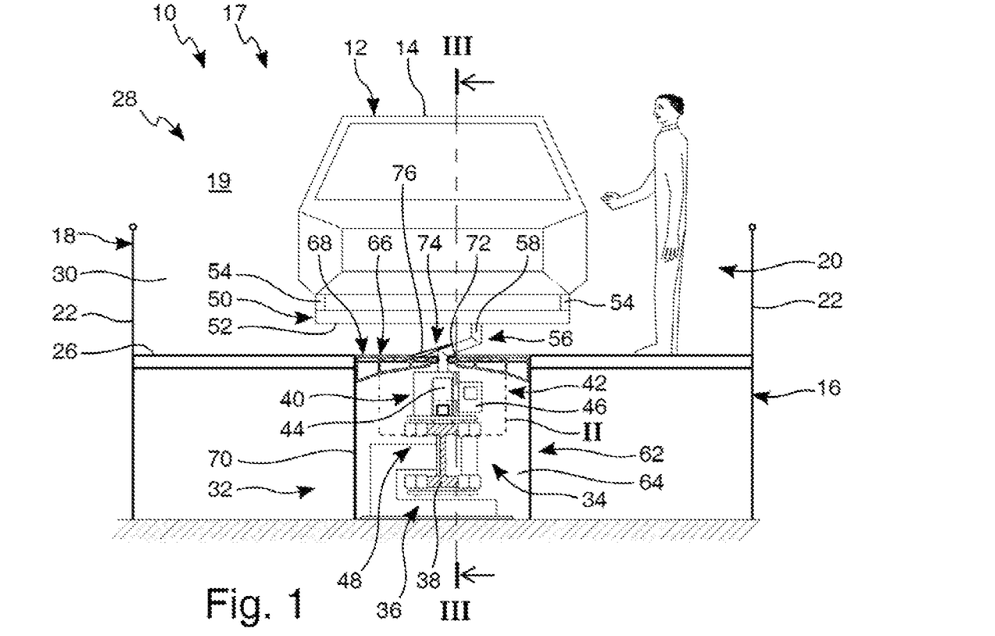
FIG. 1 schematically shows a partial cross section of a treatment plant along the angled section line I-I in FIG. 3, having a treatment space and a running space for a transport system, said running space being disposed outside the treatment space and by way of a passage connection being connected to the treatment space, wherein a walk-on cover element is shown in a release position.
Figure 2:
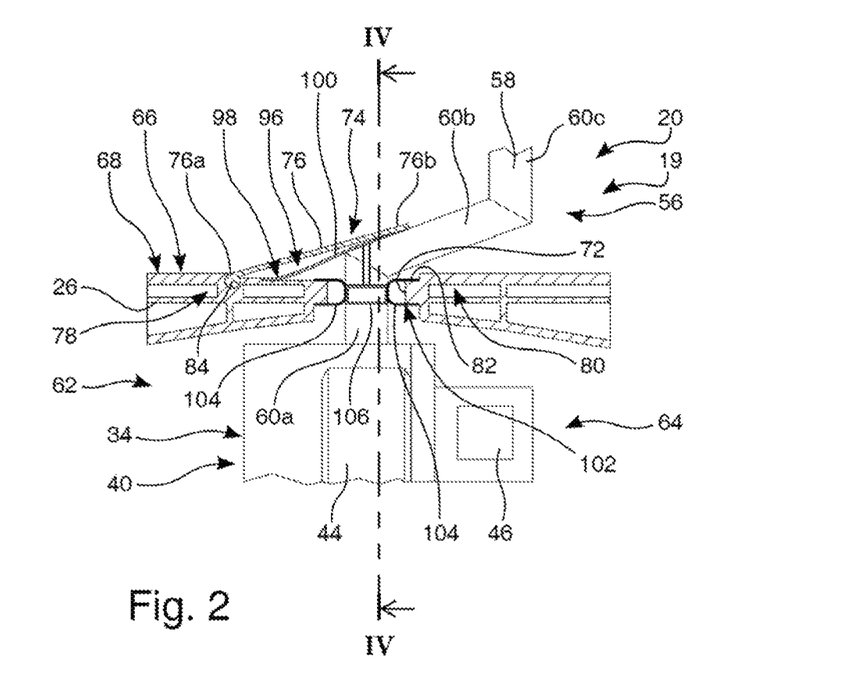
FIG. 2 shows a detailed view of a section of the passage connection between the treatment space and the running space, having the cover element according to the fragment II in FIG. 1.
Figure 4:
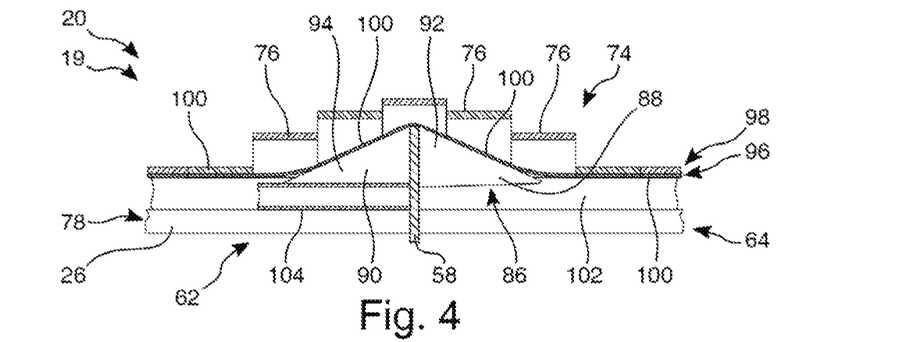
FIG. 4 shows a detailed view according to the fragment IV in FIG. 3, along the section line IV-IV in FIG. 2.
Figure 5:
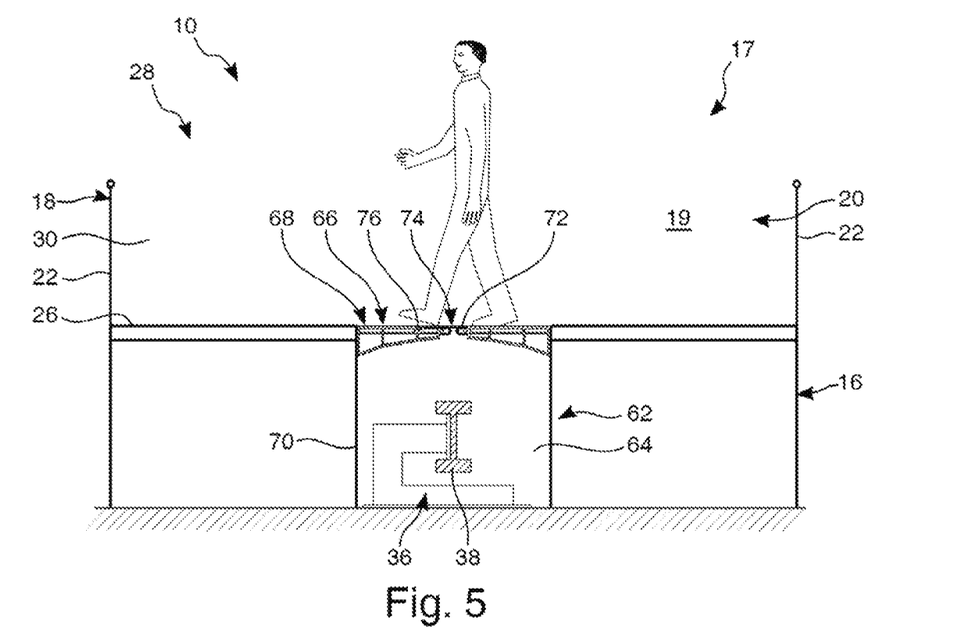
FIG. 5 shows a section of the treatment plant according to FIG. 1, having the cover element in a walk-on position.
Figure 6:
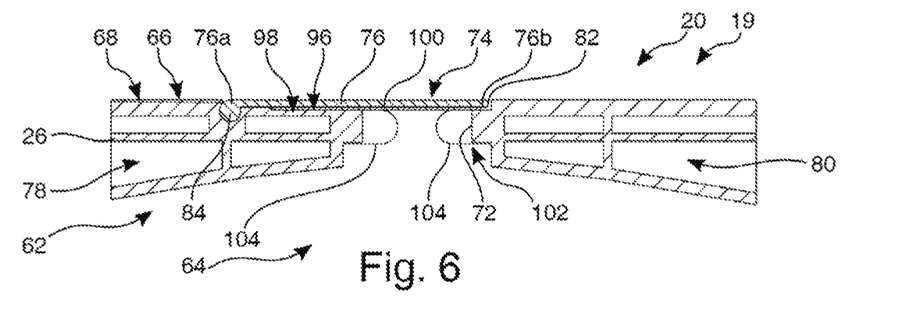
FIG. 6 shows a detailed view corresponding to FIG. 2, having the cover element in the walk-on position according to FIG. 5.

For this reason, a cover installation 74 which comprises at least one walk-on cover element 76 is present in the treatment tunnel 20, said cover element 76 being capable of being moved between a walk-on position in which said cover element 76 covers the connection passage 72 and a release position in which said cover element 76 can be passed by the connection installation 56 of the transport truck 34. FIGS. 5 and 6 show a cover element 76 in the walk-on position thereof; FIGS. 1 and 2 show a cover element 76 in the release position thereof, and FIGS. 3 and 4 show cover element 76 in the walk-on position thereof as well as cover element 76 in the release position thereof.

In the case of the exemplary embodiment described here, the cover installation 74 comprises a multiplicity of cover elements 76 having a fastening end 76*a* and an opposite bearing end 76*b*. The cover elements 76 in the longitudinal direction of the treatment tunnel 20 are disposed so as to be mutually contiguous. As has been explained at the outset, mutually contiguous means that a spacing can be present between two neighboring cover elements 76, as long as said spacing, or the intermediate space resulting therefrom, respectively, between two neighboring cover elements 76 in turn does not per se form a hazard, in particular a tripping hazard, to people in the treatment tunnel 20. Such a spacing can still be up to 2 cm, for example. A tripping hazard is prevented in a comparatively reliable manner at a spacing between 1 mm and 5 mm.

Each cover element 76 at the fastening end 76*a* thereof on a first side 78 of the connection passage 72 is fastened to the tunnel floor 26. The cover element 76 is in particular plate-shaped and in this case is preferably disposed so as to be parallel with a horizontal plane when said cover element 76 assumes the walk-on position thereof in which said cover element 76 bridges the connection passage 72.

A support structure 82 is configured on the second side 80 of the tunnel floor 26, said side 80 being opposite in relation to the connection passage 72, each cover element 76 in the walk-on position thereof by way of the bearing end 76*b* thereof bearing on said support structure 82 and being released from said support structure 82 in the release position of the cover element 76. Said support structure 82 in the case of the present exemplary embodiment is configured as a lowered step on the periphery of the tunnel floor 26. Each cover element 76 in the walk-on position is preferably disposed such that on both sides of the connection passage 72 there is a crossing from the cover element 76 to the tunnel floor 26, or in general terms to the separation wall 66 between the running space 64 and the treatment tunnel 20, said crossing largely not having any protrusions, elevations, or other irregularities, as visualized by FIG. 6.

The cover elements 76 in the case of the present exemplary embodiment are rigid and at the location of the fastening of said cover elements 76 to the first side 78 of the tunnel floor 26 are mounted so as to be movable. To this end, the cover elements 78 in the case of the present exemplary embodiment are mounted so as to be upwardly pivotable about a horizontal pivot axis 80 which runs so as to be parallel with the longitudinal direction of the treatment installation 16.

In practice, the rigid cover elements 76 are made from aluminum. However, other materials which are adequately firm under foot and which also have to be suitable for the conditions prevailing in the operation in the treatment tunnel 20, such as stainless steel or else plastics materials, for example, are also to be considered.

In the case of one modification (not shown in detail) the cover elements 76 can also be flexible, that is to say be in particular flexural, as long as the required firmness underfoot in the walk-on position is ensured herein. In particular, a pivotable mounting on the first side 78 of the tunnel floor 26 can in this instance be dispensed with when the cover elements 76 immovably fastened to the first side 78 of the tunnel floor 26 are upwardly flexural. Optionally, to this end a plate-shaped cover element 76 can also be formed from individual link elements which are movably coupled to one another in such a manner that such a cover element 76 from a horizontally aligned walk-on position can be bent upward yet is firm underfoot in the walk-on position. Alternatively, flexible cover elements 76 can also be pivotably fastened to the first side 78 of the tunnel floor 26.

In the case of one further modification (not shown in detail) the cover elements 76 can also be mounted so as to be pivotable about a vertical pivot axis and from the walk-on position not move upward but in a horizontal plane to the release position. The spacings or intermediate spaces, respectively, mentioned above are in particular present in this case between two mutually contiguous cover elements 76 such that such pivoting is possible without any risk to the safety of people. Such cover elements 76 are preferably urged to the walk-on position thereof by spring pre-tensioning. For example, cover elements 76 can also be configured by the arms of a type of turnstile which is mounted such that a stanchion 58 of the connection installation 56 of the transport truck 34 impacts on an arm of the turnstile and pushes said arm away so that the turnstile is rotated and instead of said pushed arm the following arm of the turnstile comes to lie behind the stanchion 58 of the transport truck 34. A snap-fit mechanism by way of which such a turnstile is held in a position without any influence of an exterior force, one of the arms bridging the connection passage 72 in said position, can be provided here in a manner known per se.

The cover elements 76 in the longitudinal direction of the treatment cabin 20 extend by approximately between 10 cm and 20 cm, preferably approximately 15 cm; this defines the width of the cover elements 76. The length of said cover elements 76, that is to say the extent thereof transversely to the longitudinal direction of the treatment space 19 between the fastening end 76*a* and the bearing end 76*b* on the support structure 82, respectively, is approximately 15 cm to 50 cm, preferably approximately 20 cm.

In a further modification of the exemplary embodiment described here, it can suffice that only a single cover element 76 is present in the treatment space 19, the connection passage 72 in this instance being able to be safely crossed at the location of said single cover element 76. Such a cover element 76 in this instance has a sufficient extent in the longitudinal direction of the treatment space 19 in order for a safe crossing to be guaranteed. For example, such a cover element 76 can be approximately 50 cm to 100 cm wide. Two or a plurality of such cover elements 76 can also be present while maintaining a spacing such that a plurality of crossings are defined in each case by one cover element 76 at a respective mutual spacing. Likewise, a plurality of narrower cover elements 76 which are mutually contiguous in the manner described above can form a cover element group and define a crossing at which the connection passage can be crossed. Accordingly, a plurality of such cover element groups can also be present.

As can be seen in FIGS. 3 and 4, the transport trucks 34 conjointly carry an adjustment installation 86 by way of which the cover elements 76 of the cover installation 74 are capable of being moved from the walk-on position thereof to the release position thereof when the transport truck 34 is moved through the treatment installation 16. The cover elements 76 of the cover installation 74 herein are moved from the walk-on position of said cover elements 76 to the release position of said cover elements 76 at the location and for the duration of the passage of the connection installation 56, that is to say in the present exemplary embodiment for the passage of the stanchions 58 through the connection passage 72. In FIG. 4, the adjustment installation 86 and associated components are provided with reference signs only in the case of the conveyor truck 34 shown at the extreme right, whereas the individual components are identified only in the case of the right conveyor truck 34.

The adjustment installation 86 on the connection installation 56, that is to say presently on the stanchions 58, comprises an adjustment structure 88 which leads in the travel direction. The adjustment structure 88 is disposed and dimensioned in such a manner that said adjustment structure 88 engages below the cover elements 76 and pushes the latter upward to the release position thereof so far that the stanchion 58 can move laterally past the bearing end 76*b* of the cover element 76 when the transport truck 34 moves through the treatment tunnel 20. In the case of the stanchions 58 having the inclined central portion 60*b*, said portion 60*b* moves past the cover elements 76; FIGS. 1 and 2 show this.

A lowering structure 90 which trails in terms of the travel direction is associated with each adjustment structure 88, the storage elements 76 in one homogenous movement sliding across said lowering structure 90 back downward into the walk-on position. The cover elements 76 herein are moved downward by gravity. Alternatively, the cover elements 76 can also be pretensioned by a spring, by way of which pretension the cover elements 76 are pushed to the walk-on position thereof in the direction toward the connection passage 76, or the support structure 82 thereon, respectively.

In the case of the present exemplary embodiment, the adjustment structures 88 are configured as an adjustment blade 92 having a wedge-shaped geometry, the blade tip of said geometry pointing in the conveying direction of the transport truck 34. The lowering structures 90 are configured as corresponding lowering blades 94 having an analogous wedge-shaped geometry, the blade tip of said geometry pointing in the direction counter to the conveying direction of the transport truck 34. A wedge-shaped geometry is presently also to be understood to be a conical structure, wherein such a wedge does not have to be rotationally symmetrical.

The tunnel atmosphere which is contaminated with pollutants such as solvents and the like can flow from the treatment tunnel 20 into the running space 64 by way of the connection passage 72, on the one hand, and the atmosphere from the running space 64 which can be polluted with abrasion dust or lubricants of the conveying technology in the running space 64 can make its way into the treatment tunnel 20 by way of the connection passage 72, on the other hand. In order for this to be prevented or at least mitigated, a shielding installation 96 is moreover present.

The shielding installation 96 in the case of the present exemplary embodiment comprises an imbricated seal 98 in which a multiplicity of sealing slats 100 in the longitudinal direction of the treatment tunnel 20 are disposed in an overlapping manner such that said sealing slats 100 cover the connection passage 72 of the tunnel floor 26. The sealing slats 100 in practice are made from a flexural sheet metal or from a temperature-resistant flexural plastics material. The sealing slats 100 in practice have a width, that is to say an extent in the longitudinal direction of the treatment tunnel 20, of approximately 10 cm to 20 cm, preferably of 15 cm, and have dimensions which are complimentary to the correspondingly dimensioned cover elements 76, wherein the latter are not disposed in an overlapping manner.

The sealing slats 100 are disposed below the cover elements 76 and are likewise moved away from the connection passage 72 by the adjustment installation 86 when the transport truck 34 moves through the treatment installation 16. The adjustment installation 86 herein consequently engages below the sealing slats 100 and then pushes upward the latter and cover elements 76 which are situated thereabove, as can be seen in particular in FIG. 2.

When the transport truck 34 drives into the dryer 16, the articulated stanchions 58 thus make their way into the connection passage 72, wherein the adjustment installation 86 push the sealing slats 96 and the cover elements 76 out of the way such that a corresponding passage window for the atmosphere of the treatment space 19 is present always only in the region of the articulated stanchions 58.

In the context of the sealing slats the person skilled in the art will know the industrial jargon of a "slat opener". Slat openers of this type are known and are used for sliding the slats of imbricated seals to the side in particular on slots sealed by the latter. The adjustment installation 86 is in principle configured in the manner of such a slat opener.

Moreover, longitudinal seals 102 in the form of rubber lips 104 are disposed on opposite peripheries of the tunnel floor 26 that flank the connection passage 72. The two stanchions 58 of a transport truck 34 are connected to one another by way of a connection stanchion 106 which is disposed and dimensioned in such a manner that said connection stanchion 106 during the movement of the transport truck 34 through the treatment tunnel 20 bears on the longitudinal seals 102. It is achieved on account thereof that there is no downward passage window for tunnel atmosphere into the running space 64 in the conveying direction behind a stanchion 58 of the transport truck 34, despite the sealing slats 100 of the imbricated seal 98 and the cover elements 76 of the cover installation 74 not yet closing the connection passage 72 again as long as sealing slats 100 and said cover elements 76 are still supported on the lowering structure 90 and are raised from the connection passage 72.

Figure 7:
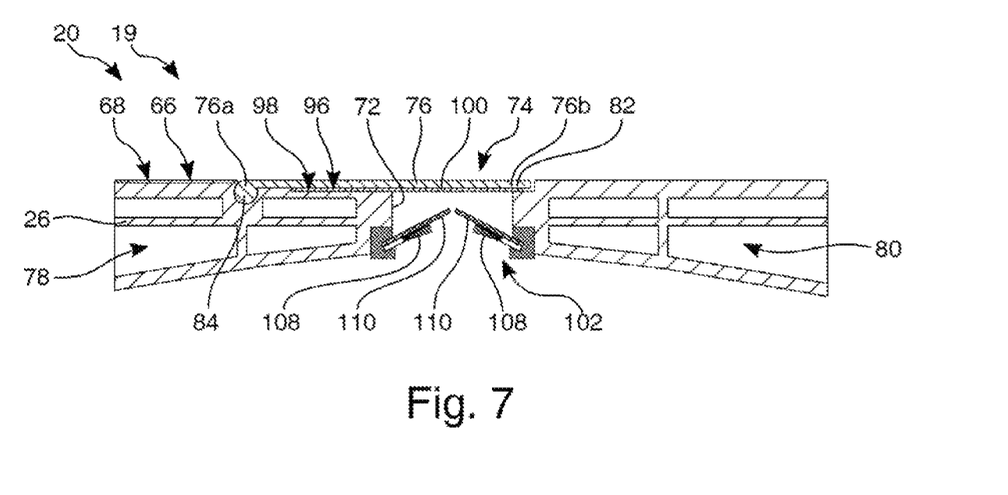
FIG. 7 shows a detailed view corresponding to FIG. 6, having a variant of a shielding installation.
Figure 8:
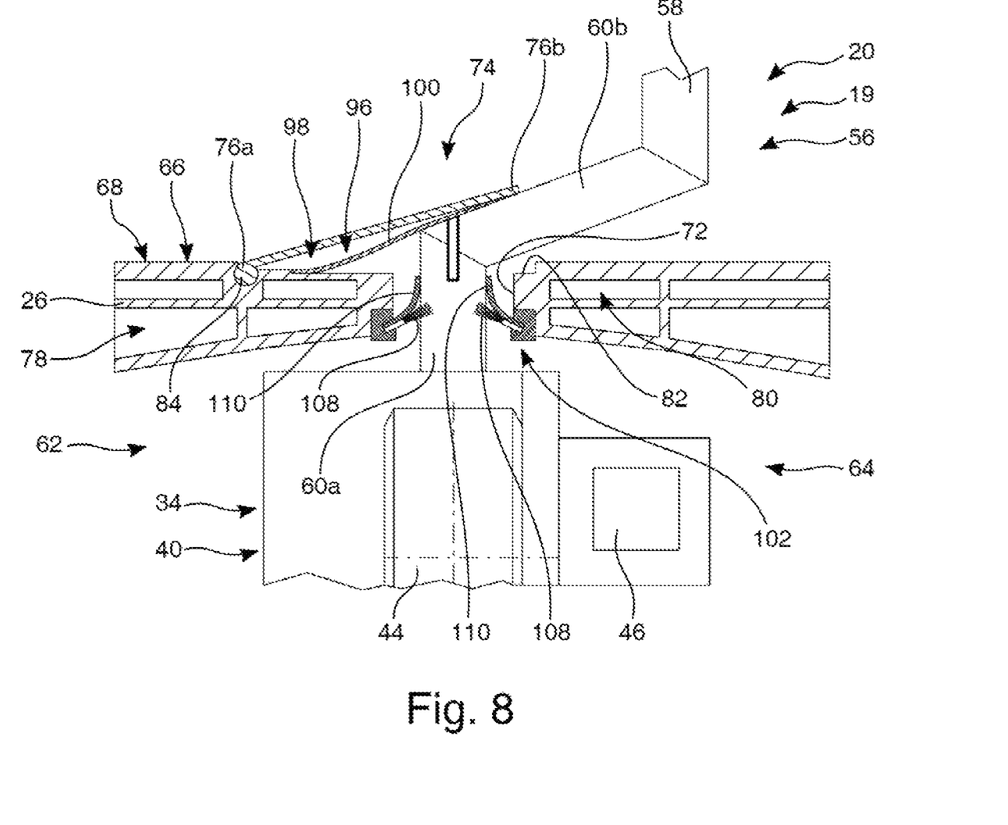
FIG. 8 again shows a detailed view corresponding to FIG. 2, having the cover element in the release position thereof, which the variant of the shielding installation.

FIGS. 7 and 8 visualize a modification of the longitudinal seals 102. Said longitudinal seals 102 on each of the opposite peripheries of the tunnel floor 26 that flank the connection passage 72 comprise longitudinal brushes 108 which in the longitudinal direction can also be assembled from brush segments. A protection against dust or particles is configured by the longitudinal brushes 108.

Moreover, the longitudinal seals 102 comprise longitudinal slats 110 of which one is in each case disposed above the longitudinal brushes 108. In the case of the present exemplary embodiment, the longitudinal slats 110 are in each case fastened directly above the longitudinal brushes 108.

In the case of the present exemplary embodiment, both the longitudinal brushes 108 as well as the longitudinal slats 110, proceeding from the opposite peripheries of the connection passage 72 are inclined upward in the inward direction, wherein an inclination angle of approximately 45° is present. Only a minor spacing, in the best case no spacing, remains between the free ends of the longitudinal slats 110, on account of which the passage area of a fluid connection between the treatment space 19 and the guiding region 62 lying therebelow, even in the case of a transport truck 34 being situated in the running space 54, is smaller than in the case of the rubber lips 104.

When the treatment installation 16 is a workstation 17 as discussed above, for example, the shielding installation 96, on the one hand, and/or the longitudinal seal 102 can optionally be dispensed with such that the connection passage 72 is at least in regions covered only by the cover installation 74.

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

What is claimed is:

1. A treatment plant for treating workpieces comprising:
   a) a treatment installation having a housing which defines a treatment space having a floor;
   b) a conveyor system which comprises a multiplicity of transport trucks by means of which workpieces are capable of being conveyed through the treatment space, wherein each transport truck comprises a running gear and a fastening installation for at least one workpiece, said running gear and said fastening installation being coupled to one another by means of a connection installation;

wherein c) a running space for the running gear is present outside the treatment space, said running space by way of a connection passage in the upward direction being connected to the treatment space in such a manner that the running gear is capable of being moved in the running space, wherein the fastening installation is conjointly carried in the treatment space and the connection installation extends through the connection passage; and further wherein d) a cover installation which comprises at least one walk-on cover element is present in the treatment space, said at least one walk-on cover element being capable of being moved between a walk-on position in which said at least one walk-on cover element covers the connection passage and a release position in which said at least one walk-on cover element can be passed by the connection installation of one of the transport trucks.

2. The treatment plant according to claim 1, wherein the at least one walk-on cover element is flexible and fastened so as to be immovable, or is flexible and mounted so as to be movable, or is rigid and mounted so as to be movable.

3. The treatment plant according to claim 2, wherein the at least one walk-on cover element is mounted so as to be pivotable about a horizontal pivot axis.

4. The treatment plant according to claim 1, wherein the cover installation comprises a plurality of walk-on cover elements which in the longitudinal direction of the treatment space are disposed so as to be mutually contiguous or mutually spaced apart.

5. The treatment plant according to claim 1, wherein a plurality of mutually contiguous walk-on cover elements form one cover element group.

6. The treatment plant according to claim 1, wherein one or a plurality of walk-on cover elements in the longitudinal direction of the treatment space have an extent of approximately 10 cm to approximately 20 cm.

7. The treatment plant according to claim 6, wherein one or a plurality of walk-on cover elements in the longitudinal direction of the treatment space have an extent of approximately 15 cm.

8. The treatment plant according to claim 1, wherein one or a plurality of walk-on cover elements in the longitudinal direction of the treatment space have an extent of approximately 50 cm to approximately 100 cm.

9. The treatment plant according to claim 1, wherein the connection passage is rectilinear or angled.

10. The treatment plant according to claim 1, wherein the connection installation comprises at least one stanchion having at least one portion which is complementary to the connection passage.

11. The treatment plant according to claim 1, wherein the transport trucks conjointly carry in each case one adjustment installation by way of which the at least one walk-on cover element or a plurality of walk-on cover elements of the cover installation are capable of being moved from the walk-on position thereof to the release position thereof when the transport truck is moved through the treatment installation.

12. The treatment plant according to claim 11, wherein the adjustment installation comprises at least one adjustment structure which in the moving direction of the transport truck leads the connection installation.

13. The treatment plant according to claim 1, wherein a shielding installation by way of which contact at least between the running gears of the transport trucks and the atmosphere of the treatment space by way of the connection passage is at least minimized.

14. The treatment plant according to claim 13 wherein the connection passage is rectilinear or angled and the shielding installation comprises a multiplicity of sealing slats which are disposed in an overlapping manner and which are disposed and specified in such a manner that said sealing slats are pushed upward by the adjustment installation when the transport truck moves through the treatment installation.

15. The treatment plant according to claim 13 wherein the connection installation comprises at least one stanchion having at least one portion which is complementary to the connection passage and the shielding installation comprises a multiplicity of sealing slats which are disposed in an overlapping manner and which are disposed and specified in such a manner that said sealing slats are pushed upward by the adjustment installation when the transport truck moves through the treatment installation.

* * * * *